United States Patent
Hu et al.

(10) Patent No.: US 9,471,367 B1
(45) Date of Patent: Oct. 18, 2016

(54) VIRTUAL MACHINE USAGE DATA COLLECTION USING SECURELY LOADED VIRTUAL FIRMWARE

(71) Applicant: International Business Machines Corporation, Armonk, NY (US)

(72) Inventors: Yanyan Hu, Beijing (CN); Yonghua Lin, Beijing (CN); Qiming Teng, Beijing (CN); Rong Yan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/962,298

(22) Filed: Dec. 8, 2015

(51) Int. Cl.
*G06F 9/455* (2006.01)

(52) U.S. Cl.
CPC ....... *G06F 9/45558* (2013.01); *G06F 9/45504* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 7,603,707 B2 * | 10/2009 | Seifert | G06F 21/57 713/164 |
| 8,086,852 B2 | 12/2011 | Bade et al. | |
| 8,286,174 B1 * | 10/2012 | Schmidt | G06F 9/5077 709/226 |
| 8,627,328 B2 | 1/2014 | Mousseau et al. | |
| 8,910,155 B1 * | 12/2014 | Sobel | G06F 17/30 713/164 |
| 8,983,987 B2 * | 3/2015 | Ravi | G06F 17/30554 707/758 |
| 9,015,704 B2 * | 4/2015 | Vandegrift | G06F 9/445 718/1 |
| 2004/0123279 A1 * | 6/2004 | Boykin | G06F 11/3644 717/158 |
| 2006/0195715 A1 * | 8/2006 | Herington | G06F 9/5077 714/4.2 |
| 2009/0241109 A1 * | 9/2009 | Vandegrift | G06F 9/445 718/1 |

(Continued)

OTHER PUBLICATIONS

J. Shao and Q. Wang, A performance guarantee approach for cloud applications based on monitoring, in COMPSACW '11. Munich: IEEE, Jul. 2011, Abstract.

*Primary Examiner* — Abdullah Al Kawsar
*Assistant Examiner* — James J Lee
(74) *Attorney, Agent, or Firm* — Cantor Colburn LLP; Kevin Jordan

(57) ABSTRACT

A computer-implemented method for collecting usage data includes running, by a computer processor, virtual firmware at least partially in a virtual hardware layer of a virtual machine. Usage data describing the virtual machine is received, at the virtual firmware and from a kernel subsystem of the virtual machine. The usage data is transmitted from the virtual firmware to a collector on a host machine that hosts the virtual machine.

18 Claims, 5 Drawing Sheets

(56) References Cited

U.S. PATENT DOCUMENTS

| | | | | |
|---|---|---|---|---|
| 2010/0161998 A1* | 6/2010 | Chen | G06F 21/57 | 713/189 |
| 2011/0055388 A1* | 3/2011 | Yumerefendi | G06F 11/3409 | 709/224 |
| 2011/0258608 A1* | 10/2011 | Li | G06F 11/3644 | 717/127 |
| 2011/0258688 A1* | 10/2011 | Peterson | G06F 9/542 | 726/7 |
| 2011/0296024 A1 | 12/2011 | Madani et al. | | |
| 2012/0245897 A1* | 9/2012 | Bose | G06F 11/3024 | 702/186 |
| 2012/0290718 A1* | 11/2012 | Nethercutt | G06F 11/3006 | 709/224 |
| 2013/0159977 A1* | 6/2013 | Crosetto | G06F 11/3636 | 717/128 |
| 2014/0025961 A1* | 1/2014 | Mackintosh | G06F 9/45533 | 713/189 |
| 2014/0040892 A1* | 2/2014 | Baset | G06F 9/455 | 718/1 |
| 2014/0095821 A1* | 4/2014 | Yang | G06F 17/30091 | 711/162 |
| 2014/0101658 A1* | 4/2014 | Blythe | G06F 11/3409 | 718/1 |
| 2014/0201357 A1* | 7/2014 | Tang | G06F 11/3466 | 709/224 |
| 2014/0258700 A1* | 9/2014 | England | G06F 21/572 | 713/2 |
| 2014/0280892 A1* | 9/2014 | Reynolds | H04L 43/028 | 709/224 |
| 2015/0154044 A1 | 6/2015 | Blythe et al. | | |
| 2015/0347272 A1* | 12/2015 | Berk | G06F 11/3636 | 717/128 |
| 2016/0094410 A1* | 3/2016 | Anwar | H04L 41/5003 | 709/223 |

* cited by examiner

VIRTUAL MACHINE USAGE DATA COLLECTION USING SECURELY LOADED VIRTUAL FIRMWARE

BACKGROUND

Embodiments of the present invention relate to virtual machines and, more specifically, to virtual machine usage data collection using virtual firmware.

It is often useful to monitor usage data for a virtual machine (VM). For instance, a VM may be used by a customer, which pays a service provider for the use of that VM. The service provider often charges the customer based on the specific usage of the VM. That usage may include, for example, central processing unit (CPU) utilization, memory utilization, and network utilization. Further, the service provider may be able to provide improved service to the customer with knowledge of how the VM is being used.

Thus, VMs are often configured to collect usage data describing their own use of available resources. VMs can then report this usage data to the host machines on which they run.

SUMMARY

According to an embodiment of this disclosure, a computer-implemented method for collecting usage data includes running, by a computer processor, virtual firmware at least partially in a virtual hardware layer of a virtual machine. Usage data describing the virtual machine is received, at the virtual firmware and from a kernel subsystem of the virtual machine. The usage data is transmitted from the virtual firmware to a collector on a host machine that hosts the virtual machine.

In another embodiment, a system for collecting usage data includes a memory having computer readable instructions and one or more processors for executing the computer readable instructions. The computer readable instructions include running virtual firmware at least partially in a virtual hardware layer of a virtual machine. Further according to the computer readable instructions, usage data describing the virtual machine is received, at the virtual firmware and from a kernel subsystem of the virtual machine. The usage data is transmitted from the virtual firmware to a collector on a host machine that hosts the virtual machine.

In yet another embodiment, a computer program product for collecting usage data includes a computer readable storage medium having program instructions embodied therewith. The program instructions are executable by a processor to cause the processor to perform a method. The method includes running virtual firmware at least partially in a virtual hardware layer of a virtual machine. Further according to the method, usage data describing the virtual machine is received, at the virtual firmware and from a kernel subsystem of the virtual machine. The usage data is transmitted from the virtual firmware to a collector on a host machine that hosts the virtual machine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Although virtual machines (VMs) are conventionally capable of collecting and reporting usage data to their host machines, the usage data collected by conventional methods is not reliable. For instance, it may be in a customer's best interest for its VM to report low usage of resources in the VM's usage data, because low usage may correlate to low costs. Because the customer has control of the VM, the customer can therefore easily hack an in-VM collection mechanism to report inaccurate usage data.

However, some types of usage data are difficult or impossible to collect from outside the VM. For instance, from outside the VM, a host machine may be unable to monitor virtual memory usage, Java virtual machine garbage collection statistics, and application response times. Additionally, when a physical central processing unit (CPU) is being shared among VMs in the form of multiple virtual CPUs, the host machine may find it difficult to determine CPU utilization of each distinct VM. Further, host-side collection of usage data can become inaccurate when such collection requires the use of agents inside the VM to intrusively change the VM image for the purpose of the collection.

According to some embodiments of this disclosure, a collection system includes virtual firmware running inside the VM, where that virtual firmware collects usage data of the VM and reports that usage data to the host machine, and where that virtual firmware is protected and inaccessible by the VM except by way of specific components. Thus, the collection system may be capable of collecting usage data that would unavailable outside the VM, but may also provide reliable information.

Figure 1:
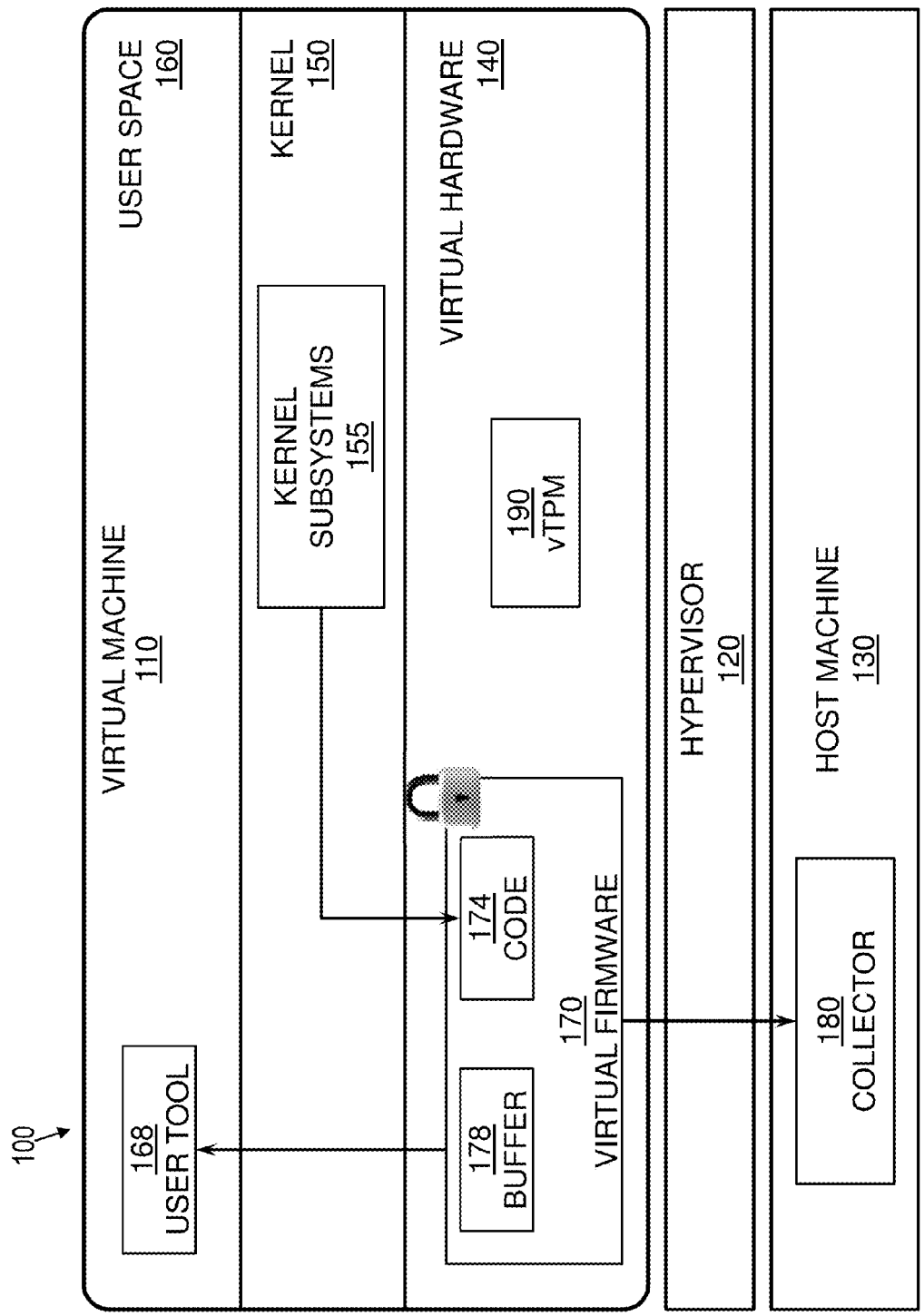
FIG. 1 is a block diagram of a collection system, according to some embodiments of this disclosure.

FIG. 1 is a block diagram of the collection system 100, according to some embodiments of this disclosure. As shown, a VM 110 may run over a hypervisor 120 on a host machine 130, also referred to as a host. In some embodiments, virtual firmware 170 may be installed on the VM 110 and may collect usage data describing a state of the VM 110. The virtual firmware 170 may report the usage data to a collector 180 on the host machine 130. Further, in some embodiments, the usage data collected by the virtual firmware 170 may be viewable on a user tool 168, which may be accessible by authorized personnel.

As shown, the VM 110 may include three layers or sets of components, which may include virtual hardware 140, a kernel 150, and a user space 160. The virtual hardware 140 of the VM 110 may include a central processing unit (CPU) and memory, which may both be virtual components. As with a conventional kernel, the kernel 150 of the VM 110 may be part of an operating system and may interpret instructions between the user space 160 and the virtual hardware 140. In some embodiments, the kernel 150 may include one or more kernel subsystems 155, each of which may be responsible for an assigned set of kernel duties. Additionally, in some instances, one or more applications may run in the user space 160.

In some embodiments, the virtual hardware 140 may further include virtual firmware 170, and the virtual firmware 170 may include code 174 and a buffer 178. The code 174 may be program code embedded in the virtual firmware 170 and executed locally, in the kernel 150, to provide operation of the virtual firmware 170, which operation will be discussed below. The buffer 178 may be a memory space for storing collected usage data.

The virtual hardware 140 may maintain a higher level of trust within the VM 110 than the kernel 150, which may maintain a higher level of trust than the user space 160. Due to running in the same abstraction layer as the virtual hardware 140, the virtual firmware 170 may run beneath the kernel 150 and therefore at a higher trust level than both the kernel 150 and the user space 160. The virtual firmware 170 may thus collect usage data from one or more kernel subsystems 155, which may have access to usage data related to the applications in the user space 160. For instance, in some embodiments, the virtual firmware 170 may collect this usage data by monitoring the kernel subsystems 155, while in some other embodiments, the kernel subsystems 155 may actively report to the virtual firmware 170.

The virtual firmware 170 may transmit the usage data of the VM 110 to the collector 180 on the host machine 130, where a service provider or other entity may access the usage data as needed. In some embodiments, the collector 180 may be a data collection system such as Ceilometer in Openstack.

The virtual firmware 170 may be configured to display some or all of the usage data by way of a user tool 168 in the user space 160 of the VM 110. Through this user tool 168, a user of the VM 110 may view the usage data. In some embodiments, the user tool 168 may operate by way of a proc file system, which is a mechanism for providing an interface to kernel data structures. The user tool 168 may be protected, such that the user is required to enter credentials to view the usage data.

Figure 2:
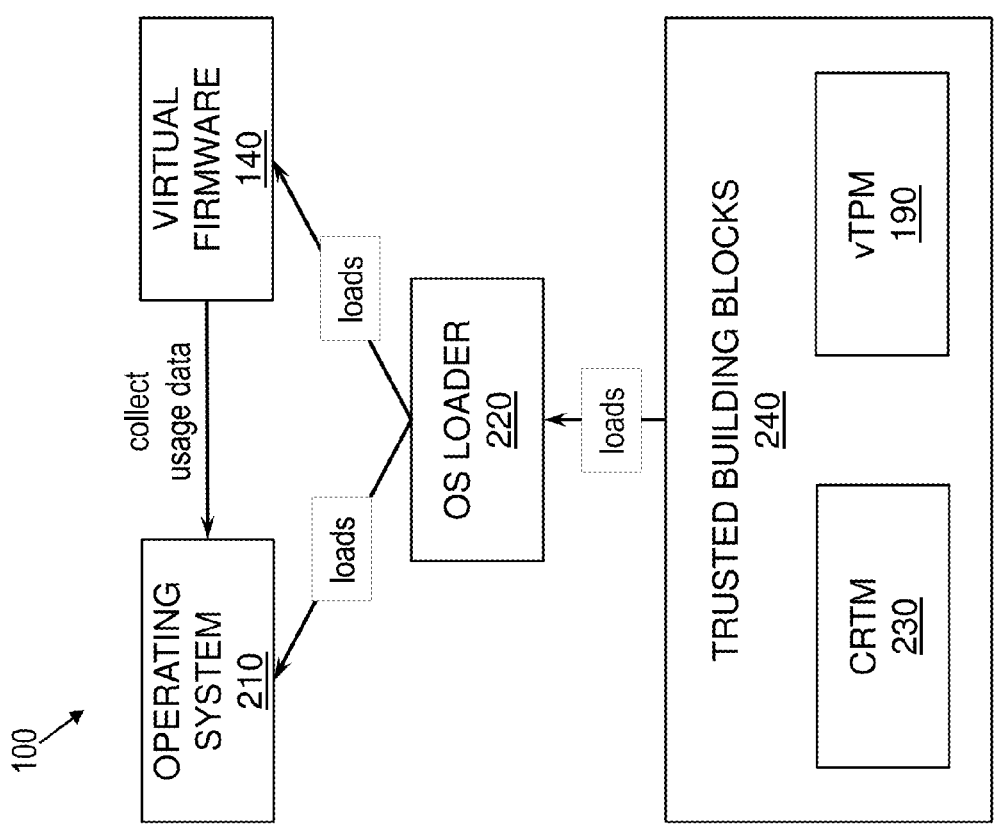
FIG. 2 is a flow diagram illustrating the loading of virtual firmware, according to some embodiments of this disclosure.

FIG. 2 is a flow diagram illustrating the loading of the virtual firmware 170, according to some embodiments of this disclosure. To ensure that the virtual firmware 170 is not tampered with, some embodiments of the collection system 100 may use a virtual trusted platform module (vTPM) 190 to protect the virtual firmware 170.

The vTPM 190 may be similar to a conventional trusted platform module (TPM), which provides cryptographic keys to ensure a process remains trustworthy. More specifically, for instance, when the VM 110 is created, the hypervisor 120 may load the vTPM 190 into the virtual hardware 140 of the VM 110. When an operating system (OS) 210 for the VM 110 is loaded by an OS loader 220 of the VM 110, the OS loader may also insert the virtual firmware 170 into the virtual hardware 140. The vTPM 190 may monitor the loading of the OS 210 to ensure that the virtual firmware 170 achieves communication with the kernel 150 in a trustworthy manner.

A core root of trust for measurement (CRTM) 230 may be executable code that is a bootstrapping component executed when a VM 110 is created. In some embodiments, the CRTM is located in secure storage of the vTPM 190. However, in some other embodiments, the CRTM may be located in firmware of the VM 110 (e.g. BIOS), thus reducing the virtual hardware costs of the vTPM 190.

When using a trusted computing model, the vTPM 190 may behave as the root of trust. However, the vTPM 190 may be a passive component, such that measurement and collection operations are actually performed elsewhere, by bootstrapping components from different layers (e.g., the CRTM 230, the OS loader 220). Together, the CRTM 230 and the vTPM 190 may form trusted building blocks (TBB) 240 for providing a secure virtual firmware 170.

The TBB 240 may execute the OS loader 220, which may load the virtual firmware 170 and execute the OS 210, as discussed above. In this manner, the virtual firmware may be placed in position in a trustworthy manner.

Figure 3:
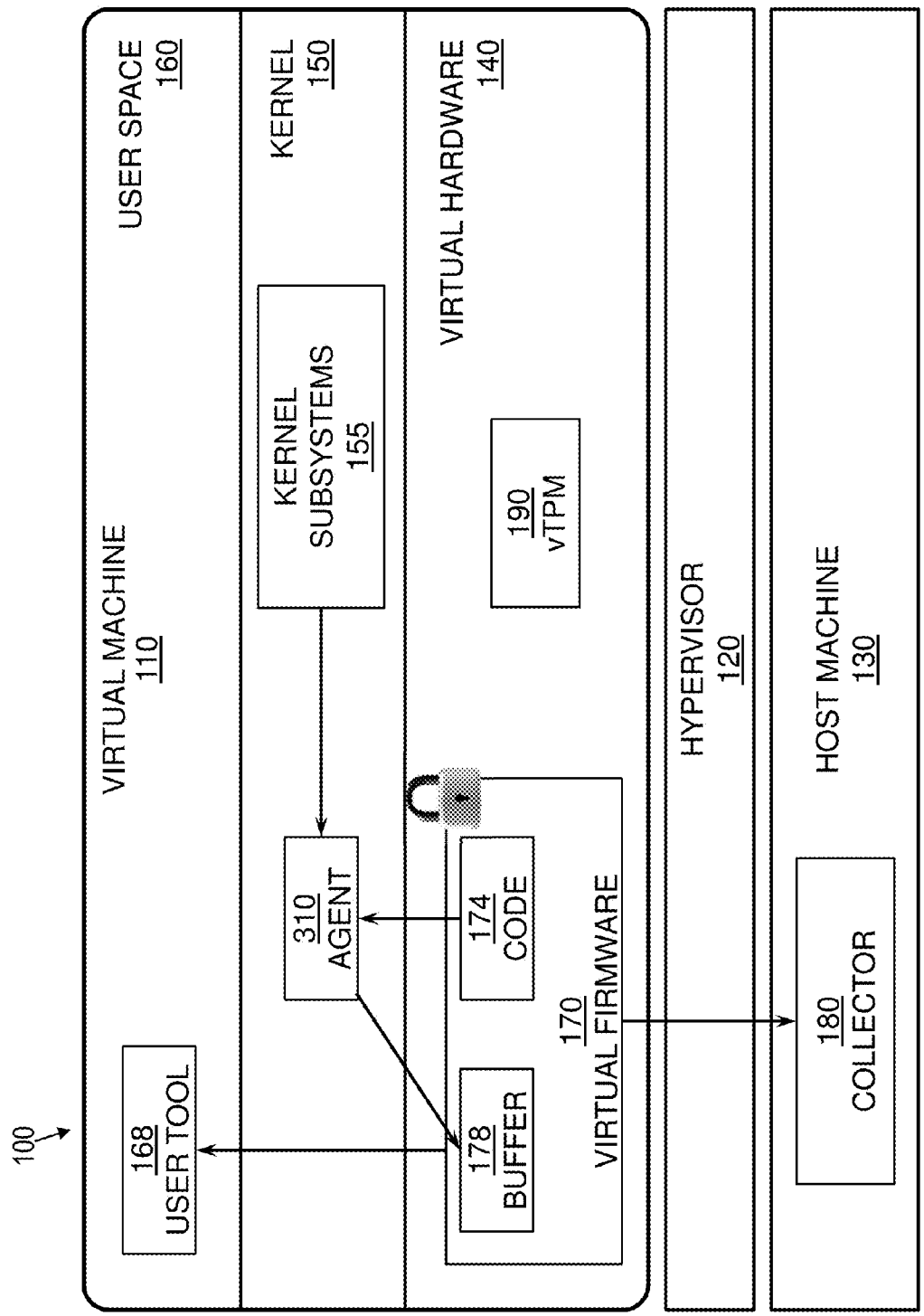
FIG. 3 is another block diagram of the collection system, according to some embodiments of this disclosure.

FIG. 3 is another block diagram of the collection system 100, according to some embodiments of this disclosure. As shown, in addition to the components described in reference to FIG. 1, the collection system 100 may further include an agent 310, which may be in communication with the one or more kernel subsystems 155 and with the virtual firmware 170.

The agent 310 may be a copy of the code 174 of the virtual firmware 170. In some embodiments, the code 174 may not be executed from within the virtual firmware 170, because the kernel 150 may view the code 174 as a data segment. In this case, the code 174 may be copied to main memory of the VM 110 and constructed into an executable segment for the code to be executed in the form of the agent 310 within the kernel 150. The agent 310 may then collect usage data from the kernel subsystems 155 as needed. The agent 310 may store the usage data in the buffer 178 of the virtual firmware 170.

Figure 4:
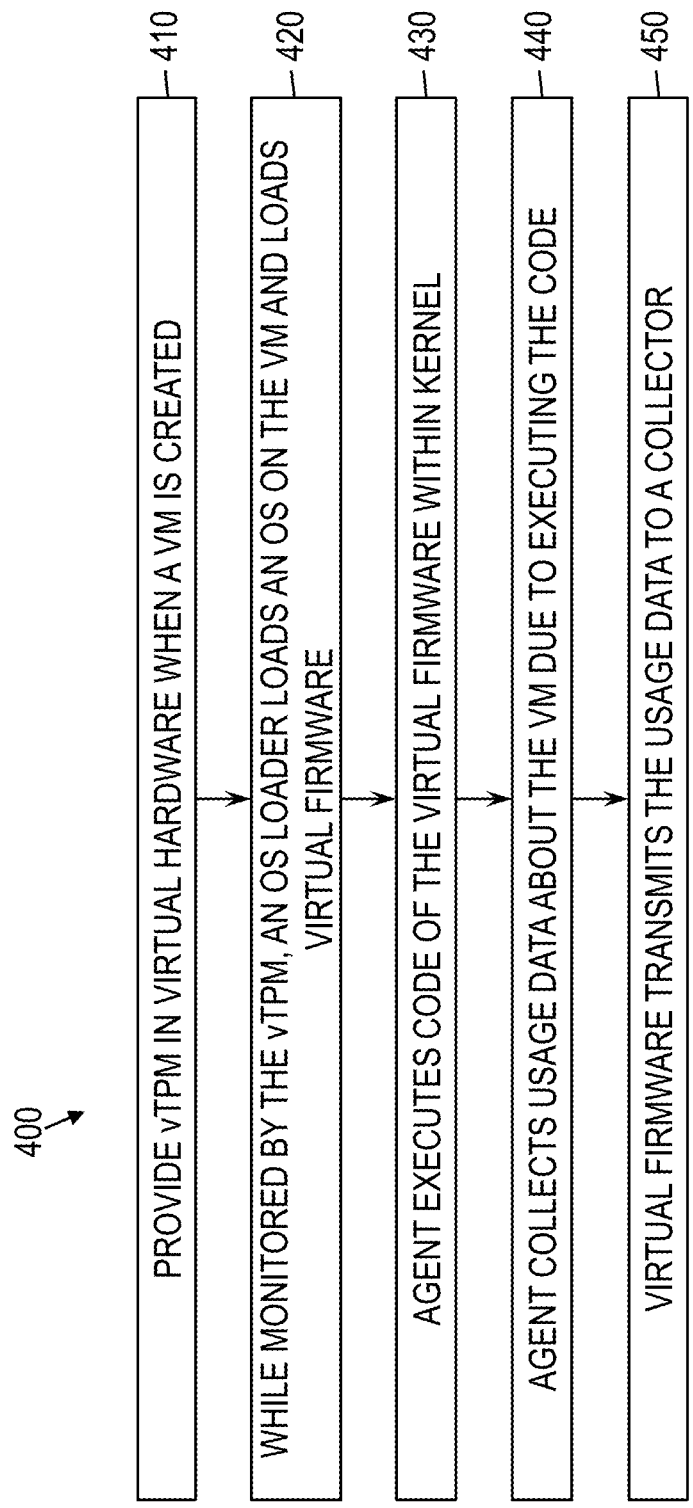
FIG. 4 is a flow diagram of a method for collecting usage data of a virtual machine, according to some embodiments of this disclosure.

FIG. 4 is a flow diagram of a method 400 for collecting usage data of a VM 110, according to some embodiments of this disclosure. As shown, at block 410, a vTPM 190 may be provided as part of virtual hardware 140 when a VM 110 is created. At block 420, while monitored by the vTPM, an OS loader 220 may load an OS 210 on the VM 110, and may also load virtual firmware 170 into the virtual hardware 140. At block 430, an agent 310 may execute the code 174 of the virtual firmware 170 within the kernel 150. At block 440, the agent 310 may collect usage data about the VM 110. At block 450, the virtual firmware 170 may transmit the usage data to a collector 180 on the host machine 130 for collection.

Figure 5:
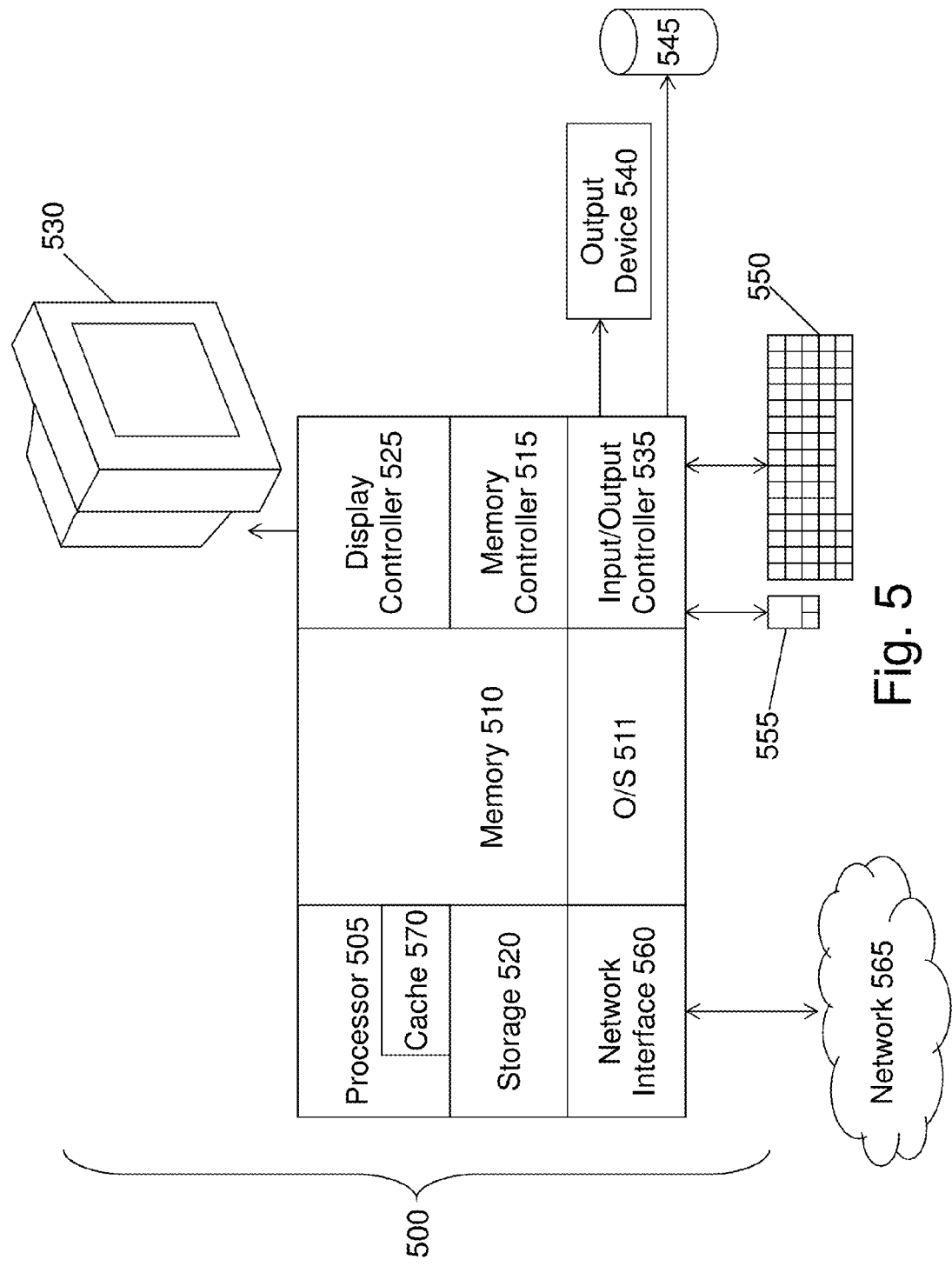
FIG. 5 is a block diagram of a computer system for implementing some or all aspects of the collection system, according to some embodiments of this disclosure.

FIG. 5 illustrates a block diagram of a computer system 500 for use in implementing a collection system 100 or method 400 according to some embodiments. The collection systems 100 and methods 400 described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For example, and not by way of limitation, the host machine 130 on which the VM 110 runs may be a computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the collection systems 100 and methods 400 of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Collection systems and methods according to this disclosure may be embodied, in whole or in part, in computer program products or in computer systems 500, such as that illustrated in FIG. 5.

Technical effects and benefits of some embodiments include the ability to measure usage data from within a VM 110 in a secure manner. This usage data may be transmitted to the host machine for collection and used for various purposes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for collecting usage data, comprising:
   loading, by a hypervisor of a host machine, a virtual trusted platform module (vTPM) into a virtual hardware layer of a virtual machine on the host machine;
   loading a virtual firmware into the virtual hardware layer of the virtual machine, wherein the virtual firmware is operative in the virtual hardware layer at a higher level of trust than a kernel of the virtual machine, and wherein the loading the virtual firmware is monitored by the vTPM to ensure secure communication between the virtual firmware and the kernel of the virtual machine;

running the virtual firmware in the virtual hardware layer and in the kernel of the virtual machine, the virtual firmware being protected from a user space of the virtual machine, wherein the virtual firmware is executed as an agent within the kernel, and wherein the agent collects usage data from a kernel subsystem within the kernel of the virtual machine;

receiving, at the virtual firmware via the agent within the kernel, the usage data of the virtual machine, the usage data describing resource utilization of the virtual machine and being protected from the user space of the virtual machine;

transmitting the usage data from the virtual firmware to a collector on the host machine, wherein the collector collects the usage data; and modifying one or more services to the virtual machine based on the usage data collected by the collector.

2. The computer-implemented method of claim 1, further comprising running a user tool in a user space of the virtual machine, wherein the user tool is in communication with the virtual firmware and is configured to provide access to the usage data.

3. The computer-implemented method of claim 2, further comprising requiring credentials for access to the user tool.

4. The computer-implemented method of claim 2, wherein running the user tool comprises using a proc file system to provide an interface between the user tool and the virtual firmware.

5. The computer-implemented method of claim 1, wherein the loading the vTPM into the virtual hardware layer of the virtual machine is performed when the virtual machine is created.

6. The computer-implemented method of claim 1, wherein the loading the virtual firmware into the virtual hardware layer of the virtual machine is performed by an operating system loader.

7. A system for collecting usage data, comprising:
a memory having computer readable instructions; and
one or more processors for executing the computer readable instructions, the computer readable instructions comprising:
loading, by a hypervisor of a host machine, a virtual trusted platform module (vTPM) into a virtual hardware layer of a virtual machine on the host machine;
loading a virtual firmware into the virtual hardware layer of the virtual machine, wherein the virtual firmware is operative in the virtual hardware layer at a higher level of trust than a kernel of the virtual machine, and wherein the loading the virtual firmware is monitored by the vTPM to ensure secure communication between the virtual firmware and the kernel of the virtual machine;
running the virtual firmware in the virtual hardware layer and in the kernel of the virtual machine, the virtual firmware being protected from a user space of the virtual machine, wherein the virtual firmware is executed as an agent within the kernel, and wherein the agent collects usage data from a kernel subsystem within the kernel of the virtual machine;
receiving, at the virtual firmware via the agent within the kernel, the usage data of the virtual machine, the usage data describing resource utilization of the virtual machine and being protected from the user space of the virtual machine;
transmitting the usage data from the virtual firmware to a collector on the host machine, wherein the collector collects the usage data; and
modifying one or more services to the virtual machine based on the usage data collected by the collector.

8. The system of claim 7, the computer readable instructions further comprising running a user tool in a user space of the virtual machine, wherein the user tool is in communication with the virtual firmware and is configured to provide access to the usage data.

9. The system of claim 8, the computer readable instructions further comprising requiring credentials for access to the user tool.

10. The system of claim 8, wherein running the user tool comprises using a proc file system to provide an interface between the user tool and the virtual firmware.

11. The system of claim 7, wherein the loading the vTPM into the virtual hardware layer of the virtual machine is performed when the virtual machine is created.

12. The system of claim 7, wherein the loading the virtual firmware into the virtual hardware layer of the virtual machine is performed by an operating system loader.

13. A computer program product for collecting usage data, the computer program product comprising a computer readable storage medium having program instructions embodied therewith, the program instructions executable by a processor to cause the processor to perform a method comprising:
loading, by a hypervisor of a host machine, a virtual trusted platform module (vTPM) into a virtual hardware layer of a virtual machine on the host machine;
loading a virtual firmware into the virtual hardware layer of the virtual machine, wherein the virtual firmware is operative in the virtual hardware layer at a higher level of trust than a kernel of the virtual machine, and wherein the loading the virtual firmware is monitored by the vTPM to ensure secure communication between the virtual firmware and the kernel of the virtual machine;
running the virtual firmware in the virtual hardware layer and in the kernel of the virtual machine, the virtual firmware being protected from a user space of the virtual machine, wherein the virtual firmware is executed as an agent within the kernel, and wherein the agent collects usage data from a kernel subsystem within the kernel of the virtual machine;
receiving, at the virtual firmware via the agent within the kernel, the usage data of the virtual machine, the usage data describing resource utilization of the virtual machine and being protected from the user space of the virtual machine;
transmitting the usage data from the virtual firmware to a collector on the host machine, wherein the collector collects the usage data; and
modifying one or more services to the virtual machine based on the usage data collected by the collector.

14. The computer program product of claim 13, the method further comprising running a user tool in a user space of the virtual machine, wherein the user tool is in communication with the virtual firmware and is configured to provide access to the usage data.

15. The computer program product of claim 14, the method further comprising requiring credentials for access to the user tool.

16. The computer program product of claim 14, wherein running the user tool comprises using a proc file system to provide an interface between the user tool and the virtual firmware.

17. The computer program product of claim 13, wherein the loading the vTPM into the virtual hardware layer of the virtual machine is performed when the virtual machine is created.

18. The computer program product of claim 13, wherein the loading the virtual firmware into the virtual hardware layer of the virtual machine is performed by an operating system loader.

* * * * *